Aug. 27, 1957  R. L. ANDERSON  2,804,077
ADJUSTABLE FINGER ASSEMBLY FOR CONCAVES
Filed April 18, 1955  2 Sheets-Sheet 1
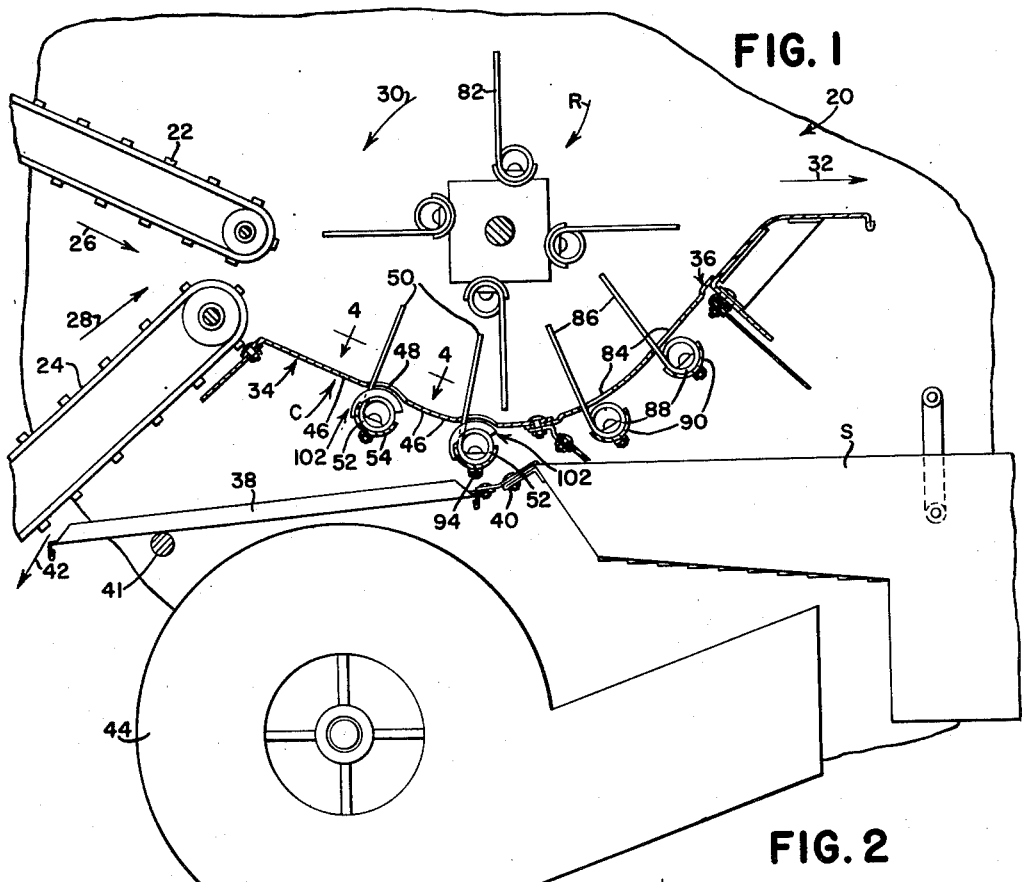
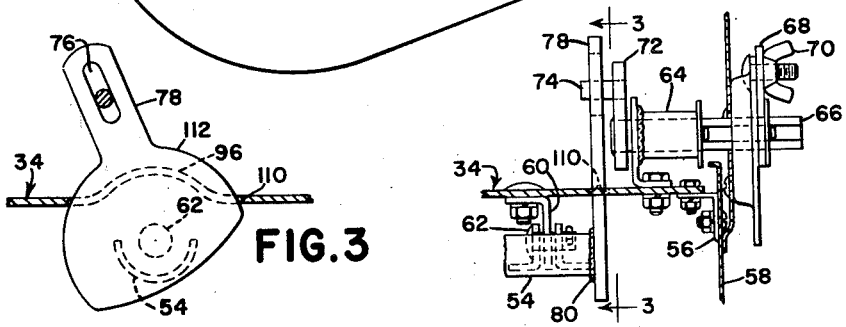
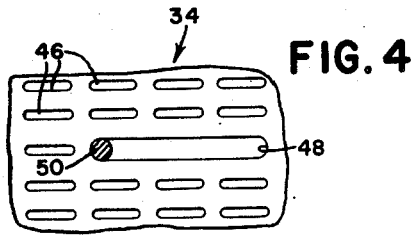
INVENTOR.
R. L. ANDERSON Aug. 27, 1957   R. L. ANDERSON   2,804,077
ADJUSTABLE FINGER ASSEMBLY FOR CONCAVES
Filed April 18, 1955   2 Sheets-Sheet 2

INVENTOR.
R. L. ANDERSON

United States Patent Office 2,804,077
Patented Aug. 27, 1957

2,804,077

ADJUSTABLE FINGER ASSEMBLY FOR CONCAVES

Ralph L. Anderson, East Moline, Ill., assignor to Deere & Company, Moline, Ill., a corporation of Illinois Application April 18, 1955, Serial No. 501,764

11 Claims. (Cl. 130—30)

This invention relates to crop-handling mechanism and more particularly to a mechanism of the type in which crop or like material is handled by means including a plate having a plurality of slots therein through which fingers respectively project to engage the material.

One example of such mechanism is represented by the threshing mechanism for handling crops such as edible beans. In such typical structure, the concave is in the form of an arcuate plate provided with a plurality of apertures or slots, some of which accommodate upwardly projecting fingers which cooperate with similar fingers on a rotating threshing cylinder. In the case of crops that are preliminarily pulled from the ground and wind-rowed and then picked up, such as is the case of edible beans, peanuts, etc., considerable dirt is taken into the machine and must be preliminarily separated from the crops in order that it is not mingled with the threshed crops. For this purpose, the fore part of the concave has dirt-escape openings therein, and the rear or after part of the concave has openings therein permitting the escape of the threshed crops. It is well known, of course, to provide various types of concaves according to the type of material being handled; that is to say, the type of crop normally dictates the sizes of the openings used in the concave. In the case of a threshing mechanism for edible beans, the openings, particularly in the dirt-clearing section of the combine, must be relatively small so that the beans cannot escape. However, the fingers that project through the concave must be adjustable fore and aft and therefore slots must be provided to accommodate these fingers. It has been found that the slots usually reach such sizes as to permit the escape of beans. According to the present invention, this problem is eliminated by the provision of guard means on the fingers which operate to close the slots yet permit adequate movement of the fingers as they are adjusted in the ranges afforded by their respective slots.

The invention takes several forms, each of which features simple and economical construction, including a guard or closure apertured to be carried by each individual finger.

The foregoing and other important objects and desirable features inherent in and encompassed by the invention will become apparent as preferred embodiments of the invention are disclosed in detail in the following specification and accompanying sheets of drawings, the several figures of which will be described immediately below.

Fig. 1 is a sectional view of the threshing portion of a typical crop-handling machine.

Fig. 2 is a transverse sectional view, on a somewhat enlarged scale, showing means for mounting one of the finger-supporting bars for adjustment of the fingers carried thereby.

Fig. 3 is a sectional view as seen on the line 3—3 of Fig. 2.

Fig. 4 is a sectional view, on an enlarged scale, as seen substantially along the line 4—4 of Fig. 1.

Figure 5:
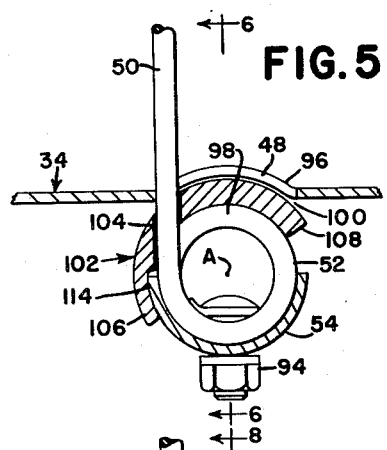
Fig. 5 is an enlarged sectional view of the finger, guard and plate relationship of Fig. 1.

Those familiar with threshing mechanisms in general will recognize in Fig. 1 a main body 20 having threshing mechanism including a threshing cylinder or rotor R cooperative with a threshing concave C. Material, such as crops, is fed to the threshing mechanism by upper and lower feeders 22 and 24, which operate in the directions of the respective arrows 26 and 28. The cylinder or rotor R rotates in the direction of the arrow 30 and crops entering the threshing mechanism from the feeders 22 and 24 are carried rearwardly over the concave for separation of the fruit from the vines or stems, the former passing through the concave to enter a reciprocating shoe S and the latter passing upwardly and rearwardly as indicated by the arrow 32 to be received by suitable walkers (not shown) as is conventional.

The concave comprises a fore part 34 and a rear part 36, the fore part being apertured, in a manner to be presently described, to discharge dirt downwardly onto a pan 38 and the rear part being apertured, also in a manner to be presently described, to discharge the fruit, such as the edible beans, into the shoe S. The pan 38 is flexibly connected at 40 to the reciprocating shoe S so as to derive a shaking action therefrom and rides on a crossbar 41, whereby the separated dirt is discharged forwardly in the direction of the arrow 42 so that such dirt will not accumulate on the top of a fan housing 44. The relationship of the fan housing 44 to the shoe S is conventional and need not be described in detail.

Fig. 4 represents the provision of perforations or apertures in the fore part 34 of the concave C. A major portion of the part 34 of the concave has a plurality of relatively small apertures 46, the size of which is sufficient to enable the free passage of dirt but to prevent the passage of beans. In addition, the part 34 has a plurality of relatively larger apertures in the form of elongated slots 48. The plural nature of the slots 48 will be apparent from Figs. 6 and 8, for example. As will be seen, each slot 48 is materially larger than any of the slots 46. Hence, beans that would not pass through the slots 46 are apt to pass through the slots 48.

The necessity for the slots 48 is occasioned by the provision of fingers 50 that project respectively through the slots 48 and that are mounted for movement or adjustment lengthwise of the respective slots.

The mounting of each finger is accomplished by the provision of the fingers in pairs and as parts of coiled spring assemblies 52 mounted lengthwise of a finger-supporting bar 54 disposed below the concave C and rockable about an axis transverse to the length of the slots 48. The supporting bar 54 thus comprises means for carrying the fingers 50 for back-and-forth movement in the slots, the fore-and-aft dimension of each finger being materially less than the length of the slot so that a relatively wide range of arcuate movement is permitted. A representative mounting of each finger bar 54 appears in Fig. 2, wherein it will be seen that the fore part 34 of the concave C is mounted at each of its opposite ends at 56 to a side wall portion 58 of the main body 20. A plurality of brackets, such as that shown at 60, provides a pivot 62 which affords the rocking axis of the bar 54.

Apart from the inherent resiliency in the fingers 50 and associated coil spring assembly 52, all the fingers on any one bar are adjusted in unison when that bar is adjusted.

Fig. 2 also shows means whereby each bar may be adjusted, this means comprising a bearing 64 in which is journaled a hexagon-ended shaft 66 having externally of the side wall 58 a manually movable arm 68. Any selected angular position of the arm 68 relative to the axis afforded by the bearing 64 may be secured by appropriate releasable lock means 70. The inner end of the shaft 66 has rigidly secured thereto a force-transmitting arm 72 which has a pin 74 operative in a slot 76 (Fig. 3) in an inner adjusting arm 78, the arm 78 being rigidly secured, as by welding at 80 (Fig. 2), to the proximate end of the associated finger bar 54. Hence, angular movement of the shaft 66 via the adjusting arm 68 causes the inner arm 72 to swing back and forth and to carry the arm 78 therewith, accordingly rocking the finger bar 54 about its pivot axis at 62 and thereby changing the angular relationship of the associated fingers to the plane of the plate afforded by the fore part 34 of the concave C. As will be seen in Fig. 1, the rotor or cylinder has fingers 82 which are interspaced with the fingers 50 and angular adjustment of the fingers 50 will vary the threshing action as the rotor rotates.

The rear part 36 of the concave C has a plurality of openings or apertures 84 therein and certain of these apertures have projecting therethrough fingers 86 very much like the fingers 50. The fingers 86 are respectively carried by coil spring assemblies 88 and finger-supporting bars 90, and provision for adjusting these finger-supporting bars is also made, which means may be similar to that shown in Fig. 2. Here again, the variations in the angles that the fingers 86 assume relative to the surface of the concave rear part 36 vary the threshing action. In view of the desirability of having the beans pass through the openings 84, these openings can be made relatively large. Hence, for all practical purposes, the construction at the rear part of the concave may be ignored except for whatever benefit may be derived from a comparison thereof with the fore part 34 of the concave.

Figure 6:
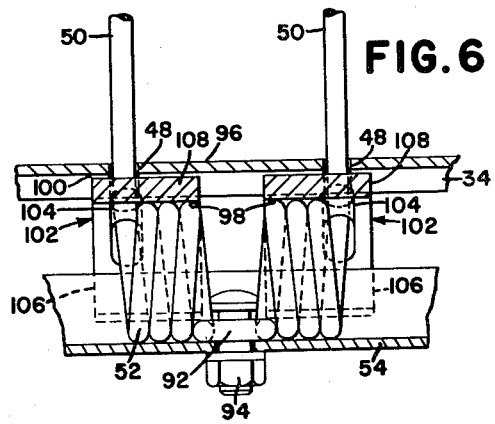
Fig. 6 is a sectional view as seen substantially along the line 6—6 of Fig. 5.

As previously described, the fingers 50 are arranged in pairs on their respective coiled spring assembly, which will be best seen in Fig. 6. The coil spring assembly comprises a pair of coiled portions interconnected by a loop 92, and this loop is secured by a nut and bolt assembly 94 to the finger bar 54. Because of the inherent resiliency in the coil spring assembly 52, the fingers 50 may have individual yielding as they are engaged by varying amounts of crops.

As already indicated generally, the fore part 34 of the concave comprises a plate and the portion of this plate in which the slots 48 are formed is an arcuate section 96 that is homocentric about the axis afforded by the pivot means 62. For convenience, this axis is indicated by the letter A in Fig. 5. As best seen in that figure, the circular nature of the coil spring assembly 52 disposes the assembly, or the means constituted thereby, in concentric relation to the axis A, and the upper portion of the coil, as at 98, is spaced below the arcuate section 48 so as to afford a guard-receiving space 100.

This space receives a slot-closing guard 102, there being as many guards as there are fingers 50, and each guard has an aperture 104 therein which closely receives the respective finger 50 or through which the finger 50 projects, the relationship thereby serving to mount each guard individually on its respective finger. The guard in Fig. 5 is arcuate and its arcuate length is greater than that of the associated slot 48, the guard thereby having slot-closing imperforate portions 106 and 108 projecting lengthwise of the slot and in opposite directions from the respective finger 50. Therefore, as the assembly is angularly adjusted about its axis A, the finger 50 can travel any desired length provided by the slot 48, and one or the other or both of the portions 106 and/or 108 will close the slot, thus preventing the escape of beans therethrough.

The individual character of the guards 102 is such that they permit the individual operational characteristics of the fingers 50. The simplicity of the manner in which each guard is mounted by being slipped over its finger 50 by means of its aperture 104 facilitates and reduces the cost of assembly.

As best seen in Figs. 2 and 3, the finger-supporting-bar adjusting arm 78 operates through a slot 110 in the end portion of the concave plate 34, which slot is necessary to accommodate the arm 78 in its back-and-forth adjusting movement. As will be appreciated, this slot 110 is of considerable length and therefore would be large enough to permit the undesirable passage of beans therethrough. Accordingly, the arm 78 has a guard element or portion 112 thereon, which element is of arcuate construction and approximates, at least in principle and basic construction, the guard 102, serving the same function relative to the slot 110 that the guard 102 serves relative to its associated slot 48. Although shown as a one-piece construction, the arm 78 and guard 112 could be made of two pieces if desired, although these details are immaterial.

Figure 7:
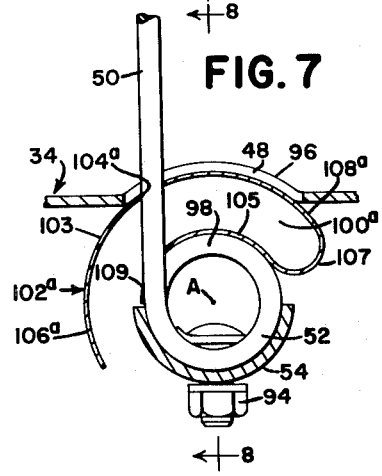
Fig. 7 is a view similar to Fig. 5 but showing a modified form of construction.
Figure 8:
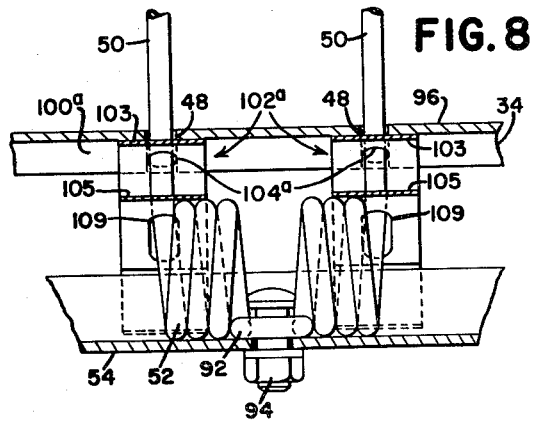
Fig. 8 is a sectional view as seen substantially along the line 8—8 of Fig. 7.

In the modified form of construction shown in Figs. 7 and 8, the bar 54 and associated spring assemblies 52 and fingers 50 are used relative to the concave plate part 34, but the spacing between the axis A and the arcuate section 96 of the concave part is somewhat greater to afford a guard-receiving space 100a. The guard in this case, designated by the numeral 102a, is of one-piece flexible sheet metal construction, having a first leg 103, a second leg 105 and an interconnecting bight or loop 107, the loop comprising resilient means interconnecting the legs 103 and 105 so as to exert a radial outward pressure on the leg 103 and a radial inward pressure on the leg 105. The leg 103 is embraced, at least in part, by the arcuate plate section 96 and the leg 105 at least partially embraces the upper portion 98 of the associated coiled spring assembly 52. The guard 102a has therein a finger-receiving aperture 104a, which functions just as does the aperture 104 in the guard 102 as already described. Here again, the guard 102a is of greater arcuate length than the slot 48, whereby to have a pair of slot-closing portions 106a and 108a, operative to keep the slot closed throughout the range of angular movement of the finger 50 about its axis A. The leg 105 is apertured at 109 for receiving a lower portion of the finger 50, whereby the guard 102a is stably connected to and sustained by the coil spring assembly 52. In the form of the invention shown in Figs. 1, 5 and 6, the guard 102 rests on and is sustained by the coil spring assembly 52, but because of its inherent radial thickness, the single aperture at 104 is adequate to carry the guard. As shown, the slot-closing portion 106 of the guard 102 is relieved at 114 to accommodate the proximate part of the bar 54.

Figure 9:
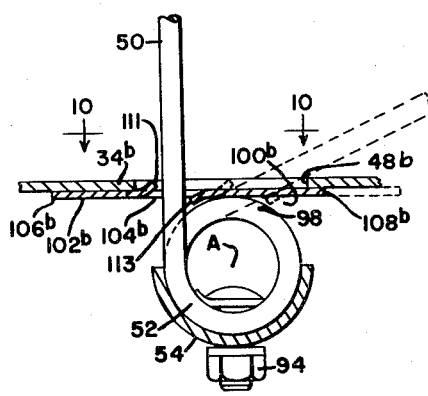
Fig. 9 is a view similar to Figs. 5 and 7 but showing a still further modified form of construction.
Figure 10:
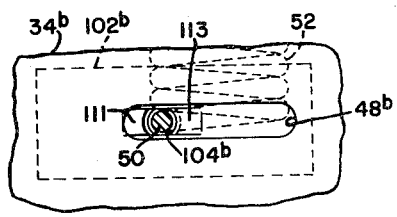
Fig. 10 is a plan sectional view as seen along the line 10—10 of Fig. 9.

In that form of the invention shown in Figs. 9 and 10, the lower concave part is flat and it is therefore designated by the reference character 34b. This part has therein an elongated slot 48b very similar to the slot 48 in either of the forms of the invention described above. The relationship of the finger 50, coil spring assembly 52 and finger bar 54 to the plate 34b is the same as that previously described, and there exists between the plate 34b and the top portion 98 of the spring assembly 54 a guard-receiving space 100b in which is received a relatively flat guard 102b. This guard is apertured at 104b to receive the finger 50 and has front and rear portions 106b and 108b which operate to close the slot 48b during the back-and-forth movement of the finger 50 as it oscillates about its axis A. In order that the angular relationship of the finger 50 to the flat surface of the plate 34b may be accommodated by the guard 102b (see dotted lines in Fig. 9), the aperture 104b has its shape defined by a process in which the aperture 104b is formed and integral portions 111 and 113 are bent or directed respectively upwardly and downwardly so that the actual fore-and-aft dimension of the aperture 104b remains constant, which will be clear from the dotted-line position just referred to. Here again, the guard 102b is sustained by the portion 98 of the coil spring assembly 52 and in addition is connected to the finger 50 by means of the receipt of the finger in the aperture 104b. In a preferred construction, the guard 102b is of flexible metal and is preferably formed with a downward bow therein so that when it is engaged between the plate 34b and element 98 it will lie in the substantially flat position as shown in Fig. 9.

A further characteristic here, as in the case of Figs. 5 and 6 and Figs. 7 and 8, is that the guards 102b are individual to the fingers 50, thereby allowing the fingers to retain their individual characteristics without interference. As shown in Fig. 10, the upward deflection of the integral portion 111 causes this portion to project partly upwardly into the slot 48b and thereby serves as additional means for guiding the guard 102b during its back-and-forth movement with the finger 50.

Various features of the invention not specifically enumerated herein will undoubtedly occur to those versed in the art, as will various other modifications and alterations in the preferred embodiments of the invention as disclosed, all of which may be achieved without departing from the spirit and scope of the invention.

What is claimed is:

1. In combination: a plate having an arcuate section and said arcuate section having an elongated slot directed circumferentially thereof; means mounted for rocking movement about an axis homocentric with the arcuate section and including a finger projecting through the slot for sweeping back and forth lengthwise of the slot as said means rocks, said means including an arcuate portion homocentric with and of smaller radius than the arcuate plate section to afford a guard-receiving space between the plate and said means; and a guard disposed in said space and carried by the finger for movement therewith and operative to close the slot throughout movement of the finger, said guard comprising a first arcuate leg longer than and following the arcuate plate section, a second arcuate leg spaced radially from the first leg and embracing the arcuate portion of the rocking means, and resilient means interconnecting the legs and operative to urge the first leg outwardly against the arcuate plate section and the second leg inwardly against the arcuate portion of the rocking means.

2. The invention defined in claim 1, in which: the guard is a one-piece flexible element bent back upon itself to provide the legs and to afford a bight joining said legs and constituting the resilient means.

3. In combination: a plate having an elongated slot therein; means rockable about an axis parallel to the plate and transverse to the length of the slot, said means having a finger extending generally radially therefrom and projecting through the slot for movement back and forth lengthwise of the slot as said means rocks, said means including a portion spaced from the plate in the direction of said axis and affording a guard-receiving space; and a guard in said space and having an aperture therein through which the finger closely passes to carry the guard for movement with the finger, said guard having slot-closing portions projecting lengthwise of the slot at opposite sides of the finger to close the slot throughout movement of the finger.

4. The invention defined in claim 3, in which: the plate is flat in the area of the slot; the guard is comparably flat to have face-to-face contact with the plate in said area; and the guard has integral portions thereof that border the aperture turned respectively upwardly and downwardly as respects the finger to accommodate the various angles that the finger makes to the plate and guard as the finger rocks while the guard slides relative to the plate.

5. A threshing concave, comprising: a support; a finger-supporting bar carried by the support for rocking about an axis; a plate above the bar and having a slot therein elongated transverse to said axis; a finger carried by the bar and projecting upwardly therefrom and through the slot for movement lengthwise of the slot as the bar is rocked, said finger including a coiled spring portion fixed to the bar in radially spaced relation to the plate to afford a guard-receiving space; and a slot-closing guard in said space, said guard having an aperture through which the finger closely extends so that the guard is movable with the finger, said guard being sustained by the coiled spring portion and further having slot-closing portions projecting lengthwise of the slot at opposite sides of the finger to close the slot throughout movement of the finger.

6. A threshing concave, comprising: a support; a finger-supporting bar carried by the support for rocking about an axis; a plate above the bar and having a pair of parallel elongated slots transverse to and spaced apart lengthwise of said axis; coiled spring means carried by the bar and having a pair of fingers spaced apart on the order of and projecting upwardly respectively through the slots for movement lengthwise of the respective slots as the bar is rocked, said coiled spring means having plate-proximate upper portions spaced below the plate; and a pair of individual slot-closing guards, one for each slot and associated finger, disposed between the plate and said upper portions of the coiled spring means, each guard having an aperture through which the respective finger closely projects to mount said guard for movement with said finger, each guard being sustained by the respective upper portion of the coiled spring means, and each guard having slot-closing portions projecting lengthwise of the respective slot in opposite directions from the respective finger to close said slot throughout movement of said finger.

7. In combination: a plate having an arcuate section and said arcuate section having an elongated slot directed circumferentially thereof; means mounted for rocking movement about an axis homocentric with the arcuate section and including a finger projecting through the slot for sweeping back and forth lengthwise of the slot as said means rocks, said means further including a portion spaced radially from the arcuate plate section to afford a guard-receiving space; and a homocentric arcuate guard connected to the finger for movement therewith, said guard being received in said space and having slot-closing portions extending at opposite sides of the finger and lengthwise of the finger for closing the slot throughout movement of the finger.

8. The invention defined in claim 7, in which: the rocking means portion is arcuate and is homocentric with the arcuate plate section; and the guard embraces said arcuate portion and is itself embraced by the arcuate plate section.

9. The invention defined in claim 7, in which: the guard has an aperture through which the finger closely extends and which serves as means mounting the guard on the finger.

10. A threshing concave, comprising: a support; a finger-supporting bar carried by the support for rocking about an axis; a plate above the bar and having a slot therein elongated transverse to said axis; means carried by the bar and including a finger projecting upwardly therefrom and through the slot for movement lengthwise of the slot as the bar is rocked; and a slot closing guard positioned beneath the plate and movable with the finger, said guard having slot-closing portions projecting lengthwise of the slot at opposite sides of the finger to close the slot throughout movement of the finger.

11. The invention defined in claim 10, including: means on the guard and projecting into the slot for guiding the guard during movement of said guard with the finger.

References Cited in the file of this patent

UNITED STATES PATENTS

| | | |
|---|---|---|
| 2,349,262 | Good | May 23, 1944 |
| 2,454,156 | Good | Nov. 16, 1948 |
| 2,644,292 | Oberholtz et al. | July 7, 1953 |